(12) United States Patent
Itabashi et al.

(10) Patent No.: US 10,372,064 B2
(45) Date of Patent: Aug. 6, 2019

(54) CONFIGURATION FOR STOPPING MOVEMENT OF A STATUS SPECIFYING ELEMENT FOR A DEVELOPING CARTRIDGE INCLUDING GEAR AND ROTATING PORTION

(71) Applicant: Brother Kogyo Kabushiki Kaisha, Nagoya-shi, Aichi-ken (JP)

(72) Inventors: Nao Itabashi, Nagoya (JP); Shota Shinoya, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/103,155

(22) Filed: Aug. 14, 2018

(65) Prior Publication Data

US 2018/0356751 A1 Dec. 13, 2018

Related U.S. Application Data

(62) Division of application No. 15/275,613, filed on Sep. 26, 2016, now Pat. No. 10,054,875.

(30) Foreign Application Priority Data

Mar. 24, 2016 (JP) .................................. 2016-060615

(51) Int. Cl.
*G03G 15/08* (2006.01)
*G03G 21/16* (2006.01)
(Continued)

(52) U.S. Cl.
CPC ..... *G03G 15/0889* (2013.01); *G03G 21/1647* (2013.01); *F16H 1/20* (2013.01);
(Continued)

(58) Field of Classification Search
CPC ............ G03G 21/1647; G03G 15/0865; F16H 25/16; F16H 1/20
See application file for complete search history.

(56) References Cited

U.S. PATENT DOCUMENTS 7,965,962 B2 6/2011 Mori
9,052,639 B2 6/2015 Peng et al.
(Continued)

FOREIGN PATENT DOCUMENTS

CN 202975597 U 6/2013
JP 2000-310902 A 11/2000
(Continued)

OTHER PUBLICATIONS

Oct. 4, 2018—(WO) IPRP—App PCT/JP2016/078180.
Dec. 13, 2016—International Search Report (English Translation)—App PCT/JP2016/078180.

*Primary Examiner* — David M. Gray
*Assistant Examiner* — Laura Roth
(74) *Attorney, Agent, or Firm* — Banner & Witcoff, Ltd.

(57) ABSTRACT

A developing cartridge includes a first gear, a second gear, and a protrusion. The first gear is rotatable about a first axis extending in a predetermined direction. The second gear is configured to engage with the first gear and rotatable about a second axis extending in the predetermined direction. The protrusion extends in the predetermined direction and circularly movable together with rotation of the second gear. The first gear is movable in a direction away from the second gear from a first position to engage with the second gear to a second position to disengage from the second gear.

6 Claims, 10 Drawing Sheets

(51) Int. Cl.
*F16H 1/20* (2006.01)
*F16H 25/16* (2006.01)

(52) U.S. Cl.
CPC ......... *F16H 25/16* (2013.01); *G03G 15/0865* (2013.01); *G03G 2221/1657* (2013.01)

(56) References Cited

U.S. PATENT DOCUMENTS

| | | |
|---|---|---|
| 2008/0317509 A1 | 12/2008 | Mori |
| 2010/0166462 A1* | 7/2010 | Igarashi ............. G03G 15/0194 399/155 |
| 2012/0039633 A1* | 2/2012 | Itabashi ............. G03G 15/0813 399/258 |
| 2012/0148297 A1 | 6/2012 | Peng et al. |
| 2013/0051833 A1 | 2/2013 | Itabashi et al. |
| 2014/0119775 A1 | 5/2014 | Peng et al. |
| 2015/0192893 A1 | 7/2015 | Itabashi et al. |
| 2016/0187812 A1 | 6/2016 | Itabashi et al. |

FOREIGN PATENT DOCUMENTS

| | | | |
|---|---|---|---|
| JP | 2008-261968 A | | 10/2008 |
| JP | 2009-003375 A | | 1/2009 |
| JP | 2011-013323 A | | 1/2011 |
| JP | 2013-501253 A | | 1/2013 |
| JP | 2013-054056 A | | 3/2013 |
| JP | 2014-191161 A | | 10/2014 |
| JP | 2014191161 A | * | 10/2014 |
| JP | 2015-132810 A | | 7/2015 |

\* cited by examiner

CONFIGURATION FOR STOPPING MOVEMENT OF A STATUS SPECIFYING ELEMENT FOR A DEVELOPING CARTRIDGE INCLUDING GEAR AND ROTATING PORTION

CROSS REFERENCE TO RELATED APPLICATION

This application is a divisional application of U.S. patent application Ser. No. 15/275,613 filed Sep. 26, 2016 which claims priority from Japanese Patent Application No. 2016-060615 filed Mar. 24, 2016. The entire contents of the priority application are incorporated herein by reference.

TECHNICAL FIELD

The present disclosure relates to a developing cartridge.

BACKGROUND

A developing cartridge includes a developing roller, and is attachable to and detachable from an image forming apparatus.

A developing cartridge according to the prior art includes a gear, and a protrusion. The gear is rotatable from a first position to a second position. The protrusion is provided at the gear, and is movable together with the rotation of the gear to be brought into contact with a lever of an image forming apparatus. The lever is moved by the contact with the protrusion. The image forming apparatus determines a specification of the developing cartridge as a result of detection of the movement of the lever. The gear includes a teeth lacking portion. Meshing engagement between the gear and a drive gear is released when the teeth lacking portion faces the drive gear. Thus, rotation of the gear is stopped to stop movement of the protrusion.

SUMMARY

In the above-described developing cartridge, a demand has been made to provide a structure other than the teeth lacking gear for stopping movement of the protrusion.

It is therefore an object of the disclosure to provide a developing cartridge capable of stopping movement of a protrusion without the teeth lacking portion in the gear which is rotatable and which is provided with the protrusion.

According to one aspect, the disclosure provides a developing cartridge that includes a first gear, a second gear, and a protrusion. The first gear is rotatable about a first axis extending in a predetermined direction. The second gear is configured to engage with the first gear and rotatable about a second axis extending in the predetermined direction. The protrusion extends in the predetermined direction and circularly movable together with rotation of the second gear. The first gear is movable in a direction away from the second gear from a first position to engage with the second gear to a second position to disengage from the second gear.

BRIEF DESCRIPTION OF THE DRAWINGS

The particular features and advantages of the disclosure will become apparent from the following description taken in connection with the accompanying drawings, in which.

DETAILED DESCRIPTION

A developing cartridge according to a first embodiment will be described with reference to FIGS. 1 through 4.

1. Overview of Developing Cartridge 1

An outline of the developing cartridge 1 will be described with reference to FIG. 1.

The developing cartridge 1 is configured to accommodate therein developing agent. The developing cartridge 1 includes a casing 2 and a developing roller 3 that is rotatable about a rotation axis extending in a predetermined direction.

1.1 Casing 2

The casing 2 extends in the predetermined direction and in which the developing agent such as toner is accommodatable. In the following description, a side in which the toner is accommodated will be referred to as an inner side of the casing 2, and a side opposite to the inner side will be referred to as an outer side of the casing 2.

An agitator is provided in the inner side of the casing 2. The agitator is configured to agitate the toner accommodated in the casing 2 and to supply the toner to the developing roller 3. The agitator includes an agitator 4 (FIG. 2) rotatable about a rotation axis extending in the predetermined direction and blades extending from the agitator 4.

1.2 Developing Roller 3

The developing roller 3 is positioned at one end portion of the casing 2, and extends in the predetermined direction. A portion of an outer peripheral surface of the developing roller 3 is exposed to an outside of the casing 2.

2. Details of Developing Cartridge 1

Figure 1:
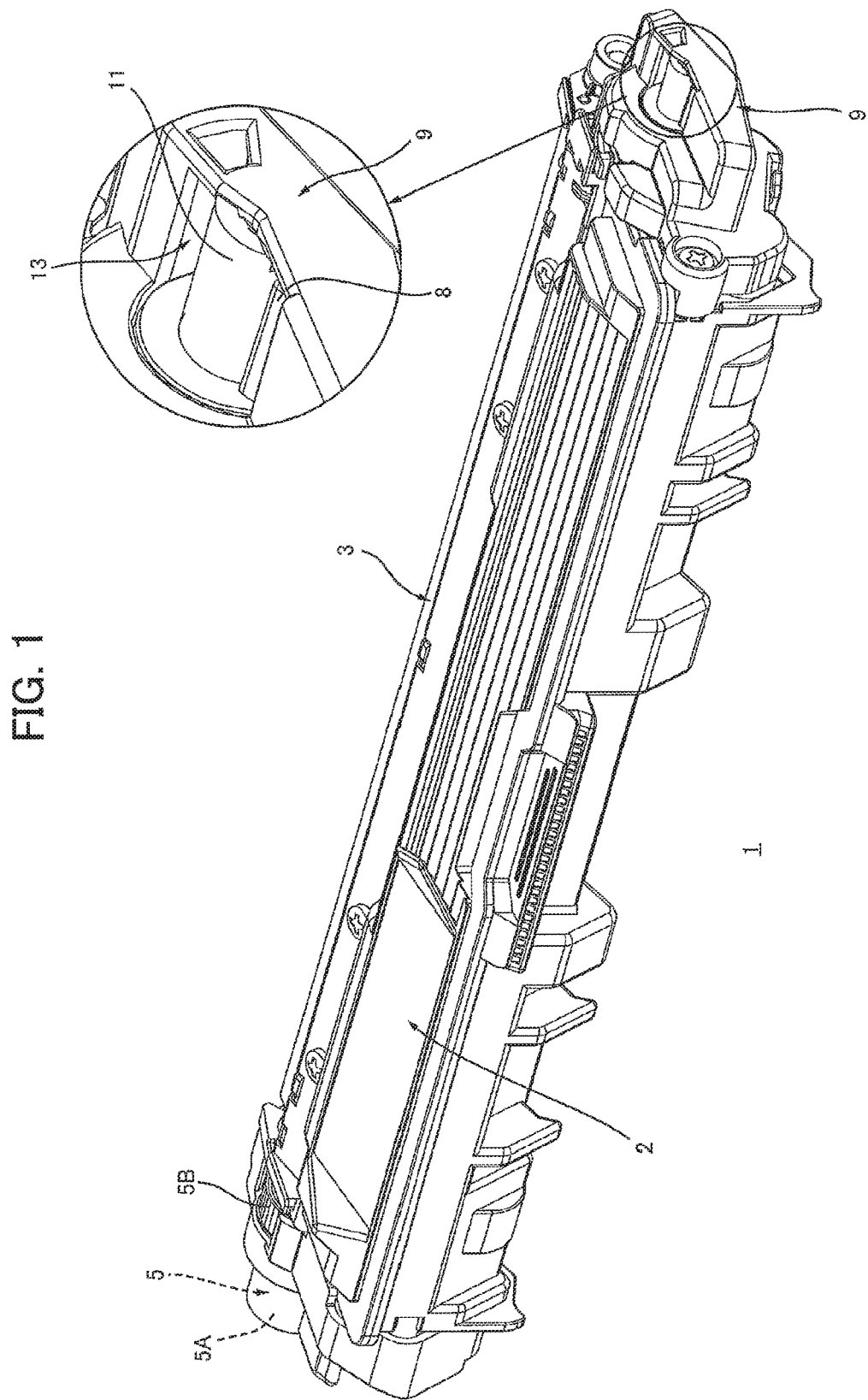
FIG. 1 is a perspective view of a developing cartridge according to a first embodiment.
Figure 2:
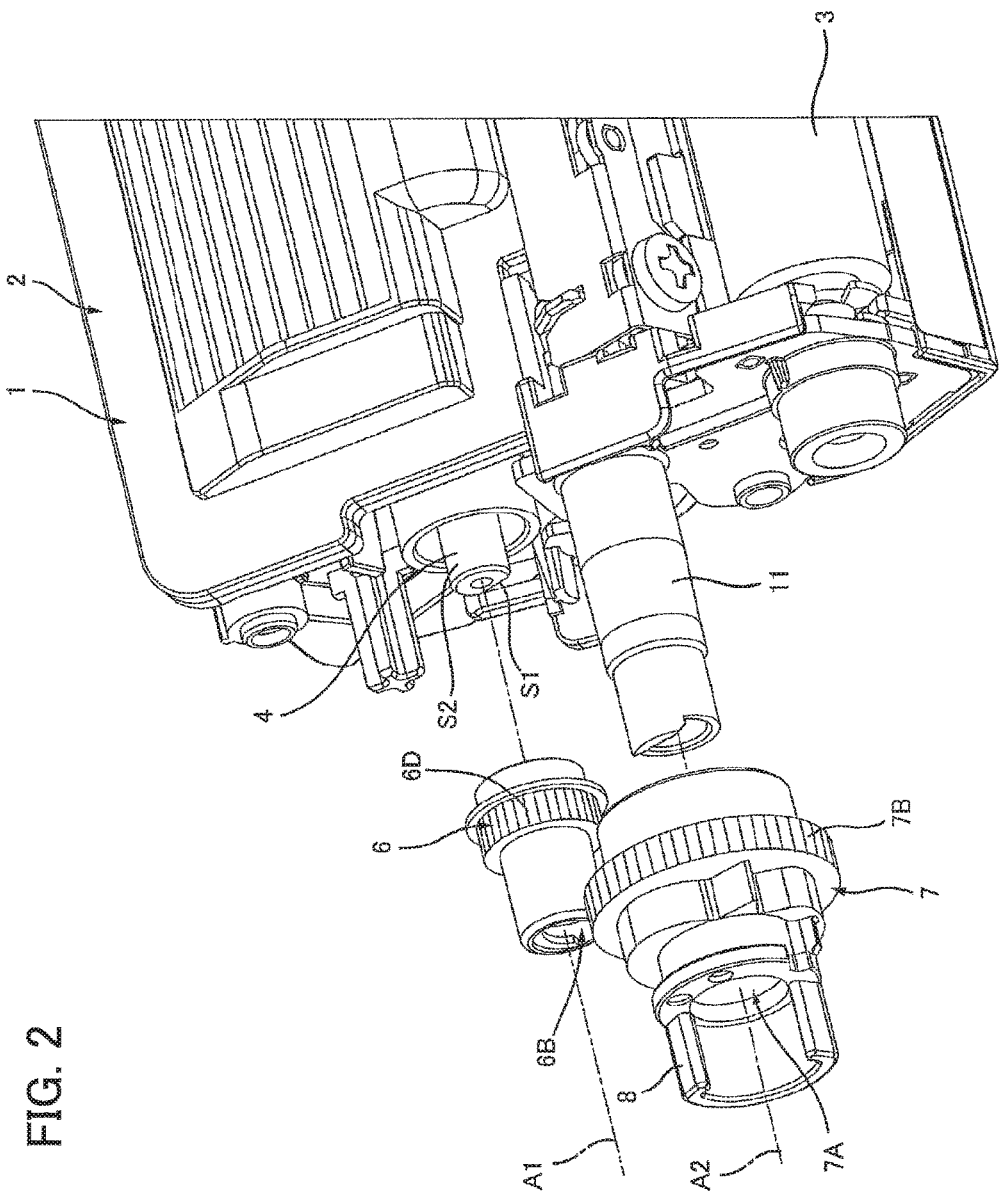
FIG. 2 is an exploded perspective view of a gear train provided in the developing cartridge according to the first embodiment.

As illustrated in FIGS. 1 and 2, the developing cartridge 1 further includes a coupling 5, a first gear 6, a second gear 7, a protrusion 8, and a gear cover 9 as well as the casing 2 and developing roller 3.

2.1 Coupling 5

The coupling 5 is positioned at an outer surface being positioned at one side of the casing 2 in the predetermined direction. The coupling 5 is rotatable about an axis extending in the predetermined direction. The coupling 5 includes a joint 5A and a coupling gear 5B.

The joint 5A is configured to receive driving force from an image forming apparatus when the developing cartridge 1 is attached thereto. The joint 5A is positioned at one end portion of the coupling 5 in the predetermined direction, and is positioned opposite to the casing 2 with respect to the coupling gear 5B in the predetermined direction. The joint 5A is engageable with a driving force input portion of the image forming apparatus. Upon engagement of the joint 5A with the driving force input portion, the coupling 5 can receive driving force from the driving force input portion.

The coupling gear 5B is positioned between the joint 5A and the casing 2 in the predetermined direction, and is rotatable together with the rotation of the joint 5A. The coupling gear 5B includes a plurality of gear teeth provided at the peripheral surface of a gear wheel portion.

Incidentally, the developing cartridge 1 is further includes a gear train (not shown) in meshing engagement with the coupling gear 5B. The gear train is positioned at the outer surface being positioned at the one side of the casing 2 in the predetermined direction, and is configured to transmit driving force to the developing roller 3 and the agitator 4.

2.2 First Gear 6

Figure 3:
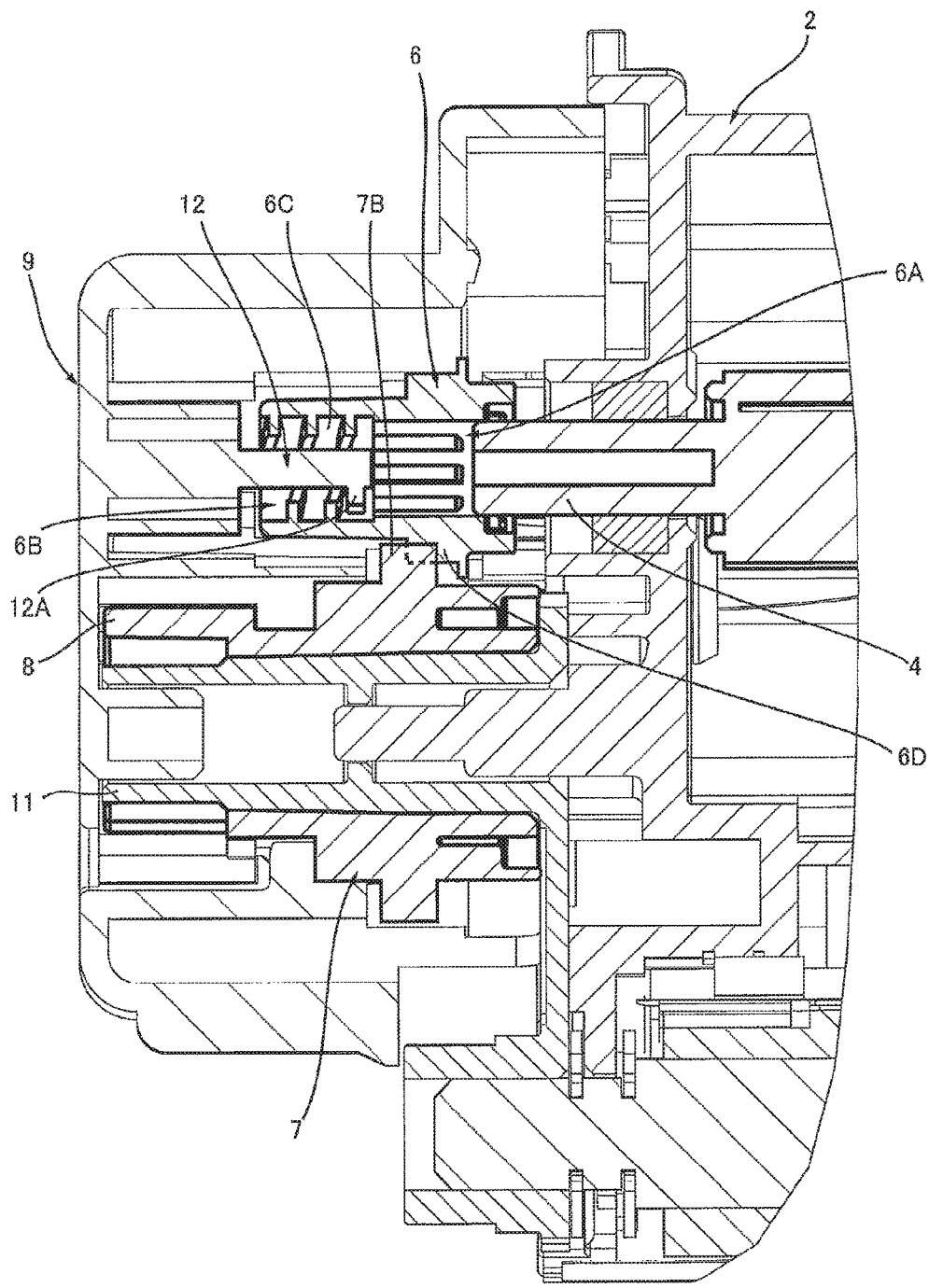
FIG. 3 is a cross-sectional view for description of movement of a first gear, and showing a state where the first gear is at a first position in the developing cartridge according to the first embodiment.

As illustrated in FIGS. 2 and 3, the first gear 6 is positioned at an outer surface being positioned at the other side of the casing 2 in the predetermined direction. The first gear 6 is positioned opposite to the coupling 5 with respect to the casing 2. The first gear 6 is mounted to the agitator 4. The agitator 4 includes one end portion and other end portion in the predetermined direction. The other end portion is positioned farther from the coupling 5 than the one end portion is from the coupling 5. That is, the first gear 6 is mounted to the other end portion of the agitator 4.

The first gear 6 includes one end portion and other end portion in the predetermined direction. The other end portion of the first gear 6 is positioned opposite to the casing 2 with respect to the one end portion of the first gear 6 in the predetermined direction. The first gear 6 has a first hole 6A and a second hole 6B. The first hole 6A is recessed from the one end portion toward the other end portion, and the second hole 6B is recessed from the other end portion toward the one end portion. The first hole 6A and second hole 6B may be in communication with each other, or the first hole 6A may be separated from the second hole 6B.

The other end portion of the agitator 4 is inserted into the first hole 6A. Thus, the first gear 6 is mounted to the other end portion of the agitator 4. The other end portion of the agitator 4 is D shaped in its cross-section. More specifically, the outer peripheral surface of the other end portion of the agitator 4 includes a flat plane portion S1 and a remaining portion formed into arcuate surface S2 (See FIG. 2). Further, the first hole 6A has a shape in conformance with the cross-sectional shape of the other end portion of the agitator 4. Thus, the first gear 6 is rotatable along with the rotation of the agitator 4 in a state where the other end portion of the agitator 4 is inserted into the first hole 6A. Accordingly, the first gear 6 can be rotated by receiving driving force from the image forming apparatus. More specifically, the driving force inputted to the coupling 5 from the image forming apparatus is transmitted to the agitator 4 through the gear train (not shown) engaged with the coupling gear 5B, and is then transmitted to the first gear 6 through the agitator 4. Consequently, the first gear 6 can be rotated by the driving force from the image forming apparatus. The first gear 6 is rotatable about a first axis A1 extending in the predetermined direction. Further, the first gear 6 is movable in the predetermined direction relative to the agitator 4.

The gear cover 9 includes a shaft 12 which is inserted into the second hole 6B. The shaft 12 is positioned opposite to the casing 2 with respect to the other end portion of the agitator 4 in the predetermined direction. The shaft 12 is spaced away from the agitator 4 in the predetermined direction, and is provided integrally with the gear cover 9. More specifically, the shaft 12 extends from an inner surface of the gear cover 9 toward the agitator 4, and includes a base end portion connected to the gear cover 9 and a free end portion positioned closer to the agitator 4 than the base end portion is to the agitator 4. The shaft 12 includes a projection 12A protruding radially outward from a peripheral surface of the free end portion of the shaft 12.

The second hole 6B of the first gear 6 is formed with a spiral groove 6C whose axis extends in the predetermined direction. The second hole 6B includes one end portion and other end portion in the predetermined direction. The other end portion of the second hole 6B is positioned opposite to the casing 2 with respect to the one end portion of the second hole 6B. The projection 12A is engaged with the groove 6C.

The first gear 6 can be moved in the predetermined direction from a first position to a second position by the rotation of the first gear 6 because of the engagement of the projection 12A with the groove 6C. More specifically, in the first position of the first gear 6 as illustrated in FIG. 3, the projection 12A is engaged with the one end portion of the groove 6C. By the rotation of the first gear 6 in a rotational direction, the first gear 6 is moved to approach the casing 2 and to the second position illustrated in FIG. 4. Incidentally, if the rotational direction is set opposite to the predetermined direction, the spiral should be set opposite to the spiral direction in FIG. 3. Thus, the first gear 6 can approach the casing 2 by the rotation of the first gear 6.

Further, the first gear 6 includes a plurality of gear teeth 6D provided at a periphery of a wheel portion of the first gear 6, and arranged in a circumferential direction thereof. The gear teeth 6D of the first gear 6 is in meshing engagement with gear teeth 7B of the second gear 7 when the first gear 6 is at the first position. On the other hand, the gear teeth 6D is positioned away from the gear teeth 7B in the predetermined direction when the first gear 6 is at the second position, so that meshing engagement between the gear teeth 6D of the first gear 6 and the gear teeth 7B of the second gear 7 is released.

2.3 Second Gear 7

As illustrated in FIGS. 2 and 3, the second gear 7 is positioned at the outer surface being positioned at the other side of the casing 2 in the predetermined direction. The second gear 7 is positioned opposite to the coupling 5 with respect to the casing 2. The second gear 7 has a through-hole 7A extending in the predetermined direction along a length of the second gear 7. A shaft 11 is positioned at the outer surfaces being positioned at the other side of the casing 2, and the shaft 11 is inserted into the through-hole 7A, so that the second gear 7 is mounted to the shaft 11. The second gear 7 includes a gear teeth 7B provided at a peripheral surface of a gear wheel of the second gear 7 and arranged in a rotational direction of the second gear 7. The second gear 7 is meshingly engageable with the first gear 6. More specifically, the gear teeth 7B is engageable with the gear teeth 6D. Thus, the second gear 7 is rotatable relative to the shaft 11 about a second axis A2 extending in the predetermined direction by receiving driving force from the first gear 6.

2.4 Protrusion 8

The protrusion 8 is positioned opposite to the casing 2 with respect to the second gear 7 in the predetermined direction. The protrusion 8 extends from the second gear 7 in the predetermined direction and integrally connected to the second gear 7. The protrusion 8 is arcuate in shape in conformance with the shape of the through-hole 7A. Thus, the protrusion 8 is circularly movable together with the rotation of the second gear 7. In the depicted embodiment, a single protrusion 8 is provided. Alternatively, a plurality of protrusions may be provided at the position around the through-hole 7A.

2.5 Gear Cover 9

As illustrated in FIG. 1, the gear cover 9 is positioned opposite to the coupling 5 with respect to the casing 2 in the predetermined direction. The gear cover 9 is attached to the other one of the outer surfaces of the casing 2 in the predetermined direction for covering the first gear 6 and the second gear 7. The gear cover 9 has an opening 13 penetrating a thickness of the gear cover 9 in a direction crossing the predetermined direction, so that the protrusion 8 and the shaft 11 can be exposed to the outside through the opening 13. As a result, when the protrusion 8 is circularly moved by the rotation of the second gear 7 relative to the shaft 11, the protrusion 8 is positioned outside of the gear cover 9 through the opening 13, and is then positioned inside the gear cover 9 through the opening 13.

3. Operation in Developing Cartridge 1

Operation in the developing cartridge 1 will next be described with reference to FIGS. 3 and 4.

As illustrated in FIG. 3, the first gear 6 is at the first position when the developing cartridge 1 is attached to the image forming apparatus.

Then upon inputting driving force to the coupling 5 from the driving force input portion of the image forming apparatus, the driving force is transmitted from the coupling 5 to the first gear 6 through the gear train (not shown) and the agitator 4. Thus, the first gear 6 is rotated. By the rotation of the first gear 6, the second gear 7 is rotated, so that the protrusion 8 is moved along the peripheral surface of the shaft 11 together with the rotation of the second gear 7. During this movement of the protrusion 8, the protrusion 8 is positioned or exposed outside the gear cover 9 through the opening 13, and is then positioned inside the gear cover 9.

Here, the first gear 6 is moved toward the casing 2 in the predetermined direction by the rotation of the first gear 6 because the projection 12A is engaged with the one end portion of the groove 6C. On the other hand, the second gear 7 is rotated but immovable in the predetermined direction. That is, the first gear 6 is moved in the predetermined direction away from the second gear 7.

After the protrusion 8 is positioned inside the gear cover 9, the engagement between the first gear 6 and the second gear 7 is released in accordance with the movement of the first gear 6 in the predetermined direction. By the disengagement, the rotation of the second gear 7 is stopped to stop circular movement of the protrusion 8. Incidentally, a timing of disengagement between the first gear 6 and the second gear 7 is adjustable in accordance with a desired signal pattern.

Figure 4:
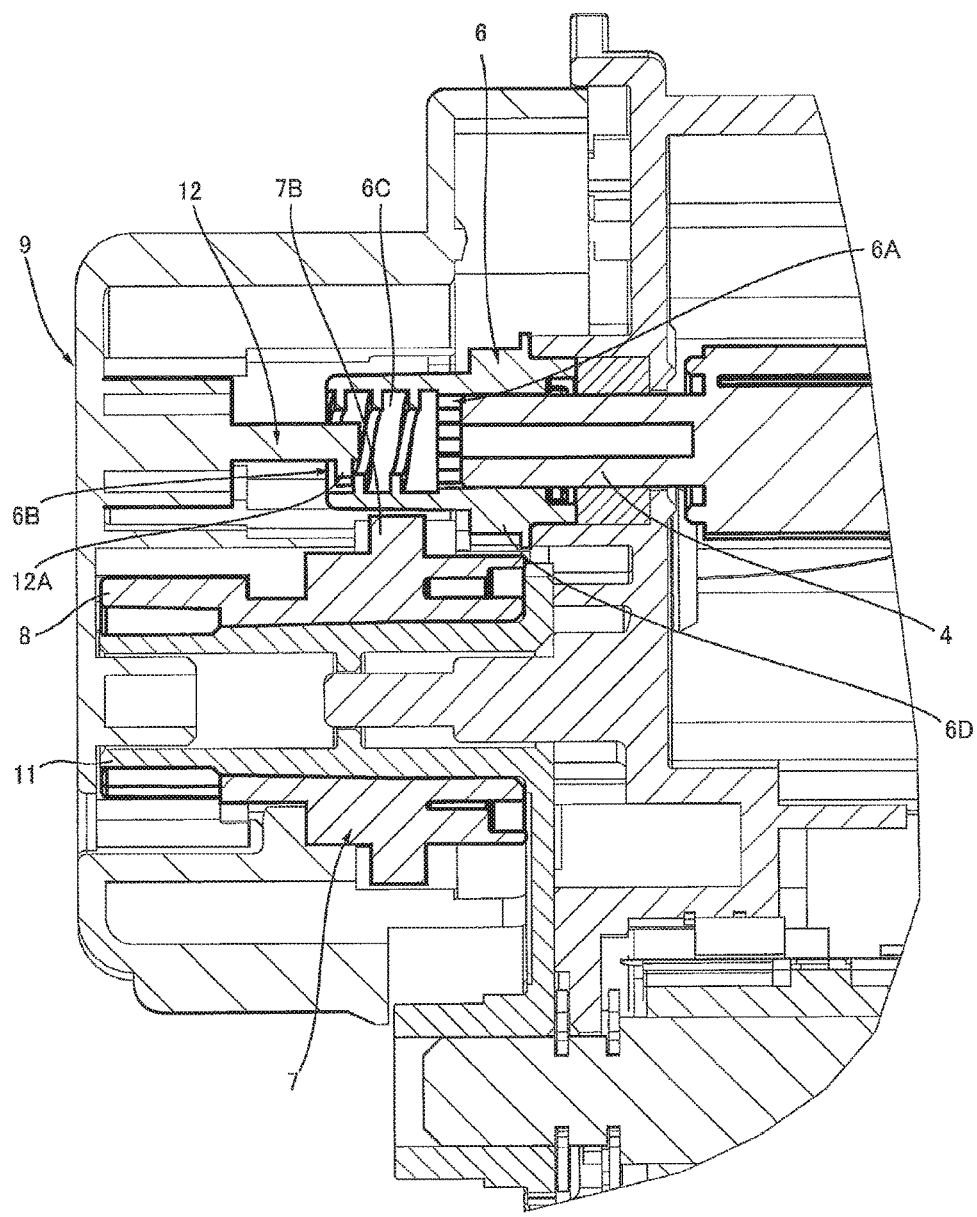
FIG. 4 is a cross-sectional view for description of movement of the first gear, and showing a state where the first gear is at a second position in the developing cartridge according to the first embodiment.

Then, as illustrated in FIG. 4, the movement of the first gear 6 in the predetermined direction is stopped when the projection 12A of the shaft 12 is moved to the other end portion of the groove 6C. This position of the first gear 6 is the second position. Incidentally, in the first embodiment, rotation of the first gear 6 is maintained along with the rotation of the agitator 4 when the first gear 6 is at the second position.

The image forming apparatus determines that the attached cartridge is a new cartridge by the detection of the outside position of the protrusion 8 relative to the gear cover 9 within a predetermined time period starting from the timing of assembly of the developing cartridge 1 to the image forming apparatus.

Further, the image forming apparatus determines that the attached cartridge is an used cartridge by the non-detection of the outside position of the protrusion 8 relative to the gear cover 9 within the predetermined time period.

4. Function and Effect

As illustrated in FIGS. 3 and 4, according to the developing cartridge 1, the first gear 6 can be disengaged from the second gear 7 by moving the first gear 6 in the predetermined direction away from the second gear 7.

With this structure, rotation of the second gear 7 and the movement of the protrusion 8 can be stopped without employing the structure that includes a teeth lacking portion at the second gear 7.

Further, the first gear 6 is positioned away from the second gear 7 in the predetermined direction when the first gear 6 is at the second position.

Therefore, the meshing engagement between the gear teeth 6D of the first gear 6 and the gear teeth 7B of the second gear 7 does not occur even if the first gear 6 continues rotating as long as the first gear 6 is at the second position.

As a result, rotation of the second gear 7 can be definitely stopped in comparison with a configuration that employs a rotatable gear having a teeth lacking portion connected to a protrusion corresponding to the protrusion 8.

5. Modification to the First Embodiment

Figure 5:
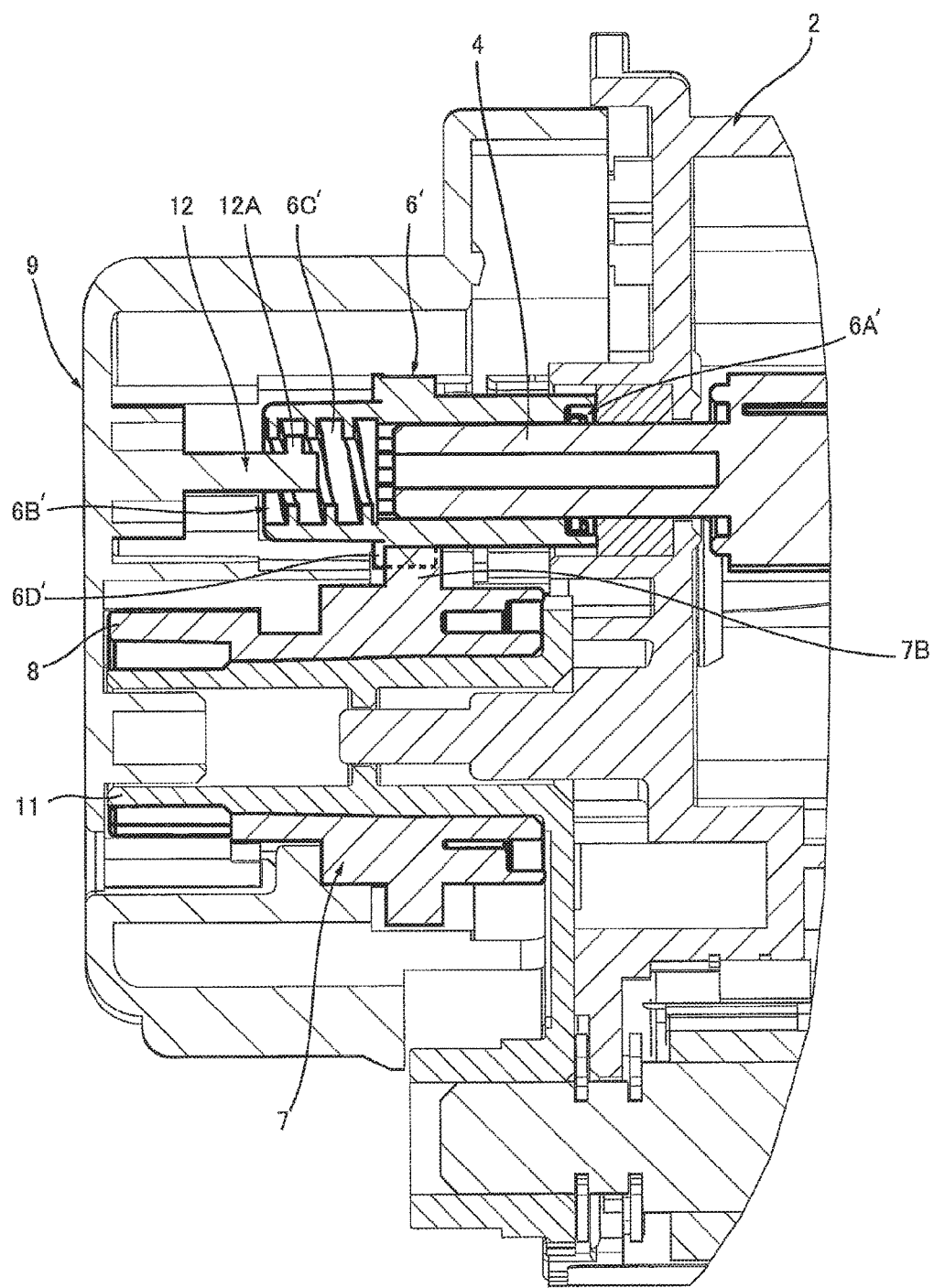
FIG. 5 is a cross-sectional view for description of movement of a first gear, and showing a state where the first gear is at a first position in a developing cartridge according to a modification of the first embodiment.
Figure 6:
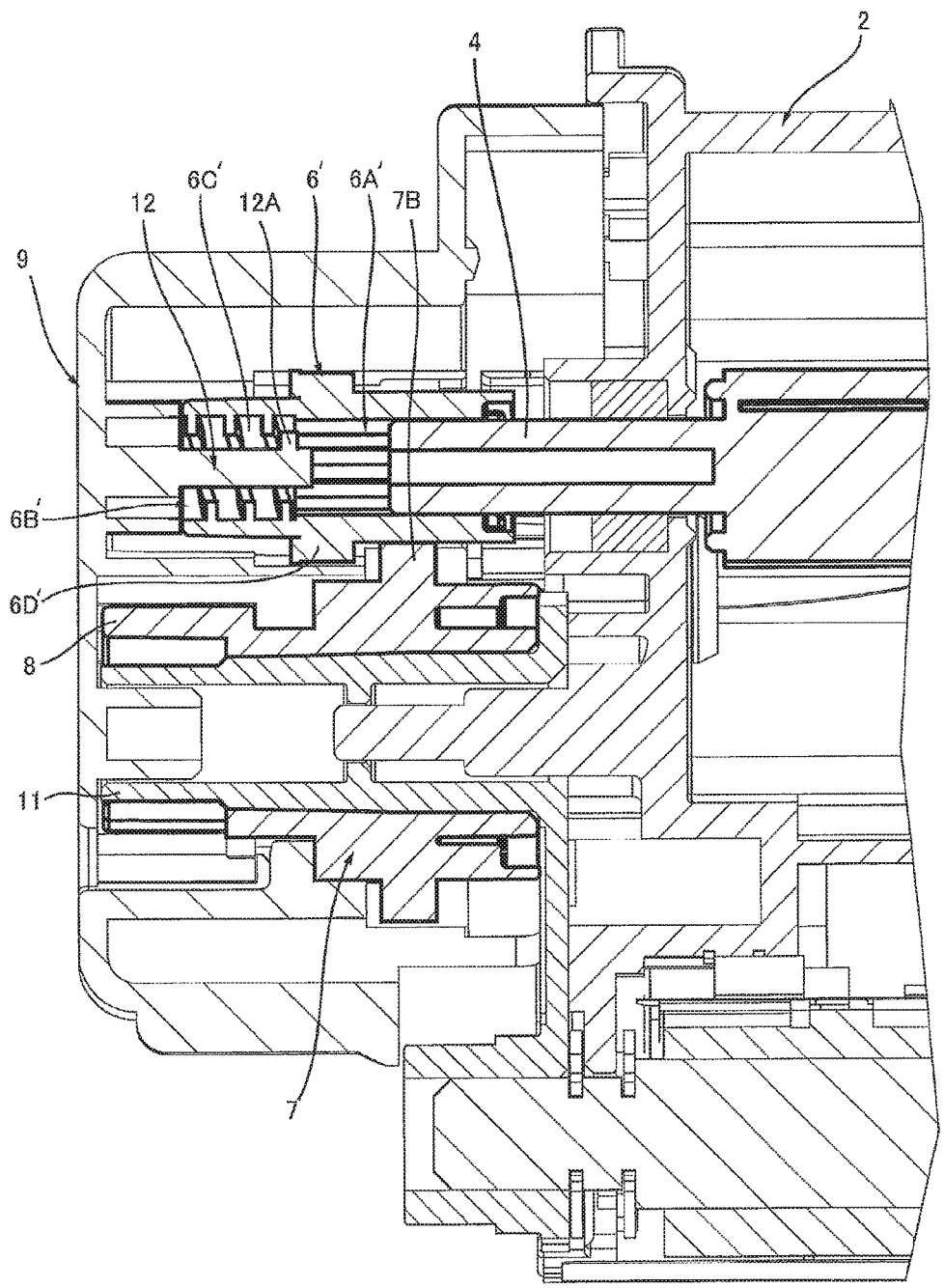
FIG. 6 is a cross-sectional view for description of movement of the first gear, and showing a state where the first gear is at a second position in the developing cartridge according to the modification of the first embodiment.

As illustrated in FIGS. 5 and 6, a first gear 6' can be moved in a direction away from the casing 2 upon rotation of the first gear 6' to disengage from the second gear 7. More specifically, spiral direction of the groove 6C' is opposite to that of the first gear 6 in the first embodiment, while the rotating direction of the first gear 6' is the same as that of the first gear 6 in the first embodiment. Incidentally, if the rotational direction of the first gear 6' is set reversed, the spiral direction of the groove 6C' should also be set reversed. With this structure, the first gear 6' can be moved in a direction away from the casing 2 upon rotation of the first gear 6'.

Further, in the first embodiment, numbers and shape of the protrusion 8 can be suitably changed in order to generate a desired signal pattern upon circular movement of the protrusion 8. For example, a plurality of protrusions 8 spaced away from each other in a rotational direction of the second gear 7 can be provided. Further, a length of the protrusion 8 in the rotational direction can be changed.

The signal pattern generated by the circular movement of the protrusion 8 can be changed so as to correspond to data of the developing cartridge 1 such as capacity of toner accumulation.

A developing cartridge 20 according to a second embodiment will next be described with reference to FIGS. 7 through 10, wherein like parts and components are designated by the same reference numerals as those shown in FIGS. 1 through 6.

1. Structure of Developing Cartridge 20

Figure 7:
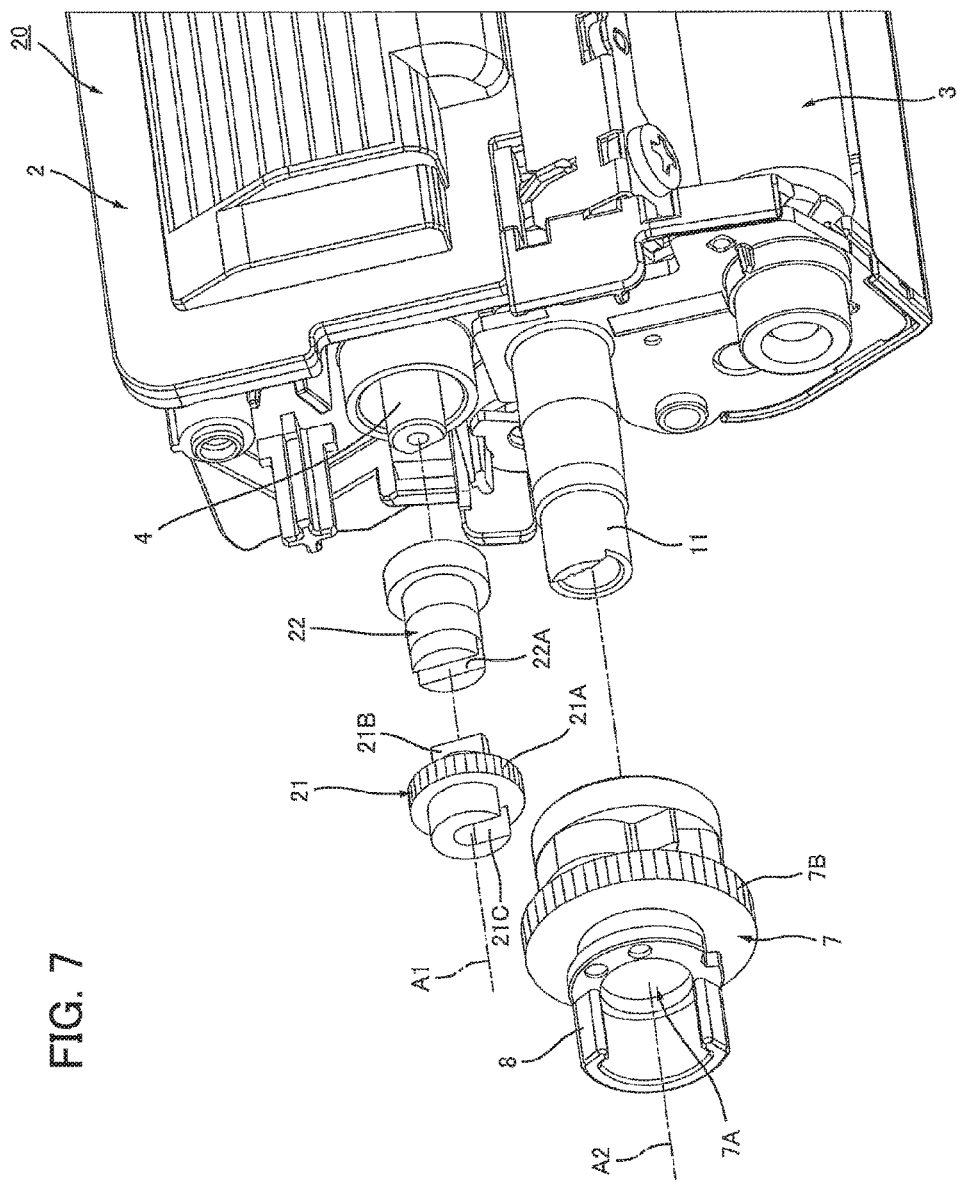
FIG. 7 is an exploded perspective view of a gear train provided in a developing cartridge according to a second embodiment.

As illustrated in FIG. 7, the developing cartridge 20 includes a first gear 21 engageable with the second gear 7, and a connector 22 for connecting the first gear 21 to the agitator 4. The first gear 21 is movable in a direction crossing the predetermined direction from a first position illustrated in FIG. 8 to a second position illustrated in FIG. 10. In the first position, the first gear 21 is rotatable in accordance with the rotation of the connector 22, and in the second position, the first gear 21 is disengaged from the connector 22. At the first position, the first gear 21 is in meshing engagement with the second gear 7, and at a second position the first gear 21 is disengaged from the second gear 7.

More specifically, as illustrated in FIG. 7, the connector 22 is positioned between the first gear 21 and the agitator 4 in the predetermined direction. The connector 22 includes one end portion and other end portion in the predetermined direction. The other end portion is positioned farther from the casing 2 than the one end portion is from the casing 2. The one end portion of the connector 22 is mounted to the other end portion of the agitator 4 such that the connector 22 is rotatable together with the rotation of the agitator 4. The other end portion of the connector 22 includes a groove 22A extending in a radial direction of the connector 22. The groove 22A is positioned at an end face of the other end portion of the connector 22. Each of the radially outermost end of the groove 22A is open.

The first gear 21 includes a gear portion including a plurality of gear teeth 21A, an engagement portion 21B, and a grooved portion 21C. The gear teeth 21A are positioned at a peripheral surface of a gear portion, and arranged in a rotational direction of the first gear 21. The engagement portion 21B is positioned closer to the connector 22 than the gear teeth 21A is to the connector 22 in the predetermined direction. The engagement portion 21B extends in the radial direction of the first gear 21 and protrudes from the gear teeth 21A in the predetermined direction toward the connector 22 to engage the groove 22A. Thus, the gear teeth 21A are rotatable together with the connector 22 in a state where the engagement portion 21B is engaged with the groove 22A. Further, since each end of the groove 22A is open, the first gear 21 is slidably movable relative to the connector 22 in the extending direction of the groove 22A. Preferably, the engagement portion 21B may be a protrusion extending in the radial direction of the first gear 21 and protruding from the gear teeth 21A in the predetermined direction toward the connector 22 to be fitted into the groove 22A, and the first gear 21 is slidably movable relative to the connector 22 in the extending direction of the groove 22A in a state where the protrusion is fitted into the groove 22A.

The grooved portion 21C is positioned opposite to the engagement portion 21B with respect to the gear teeth 21A. The grooved portion 21C includes a groove extending in the radial direction of the first gear 21 and in the extending direction of the engagement portion 21B. One end of the groove of the engagement portion 21B is open, while another end of the groove is closed.

Figure 8:
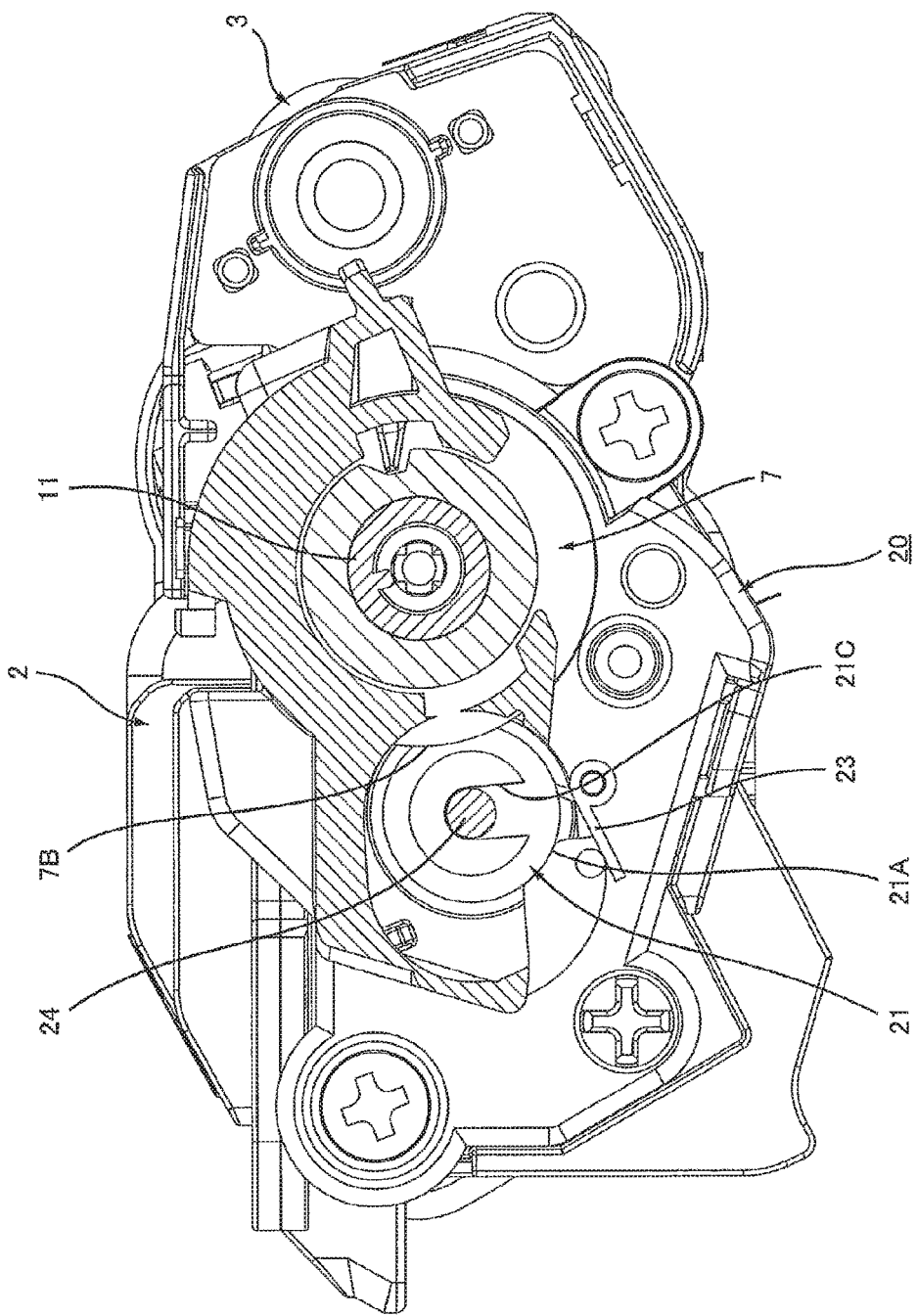
FIG. 8 is a cross-sectional view for description of movement of a first gear, and showing a state where the first gear is at a first position in the developing cartridge according to the second embodiment.
Figure 9:
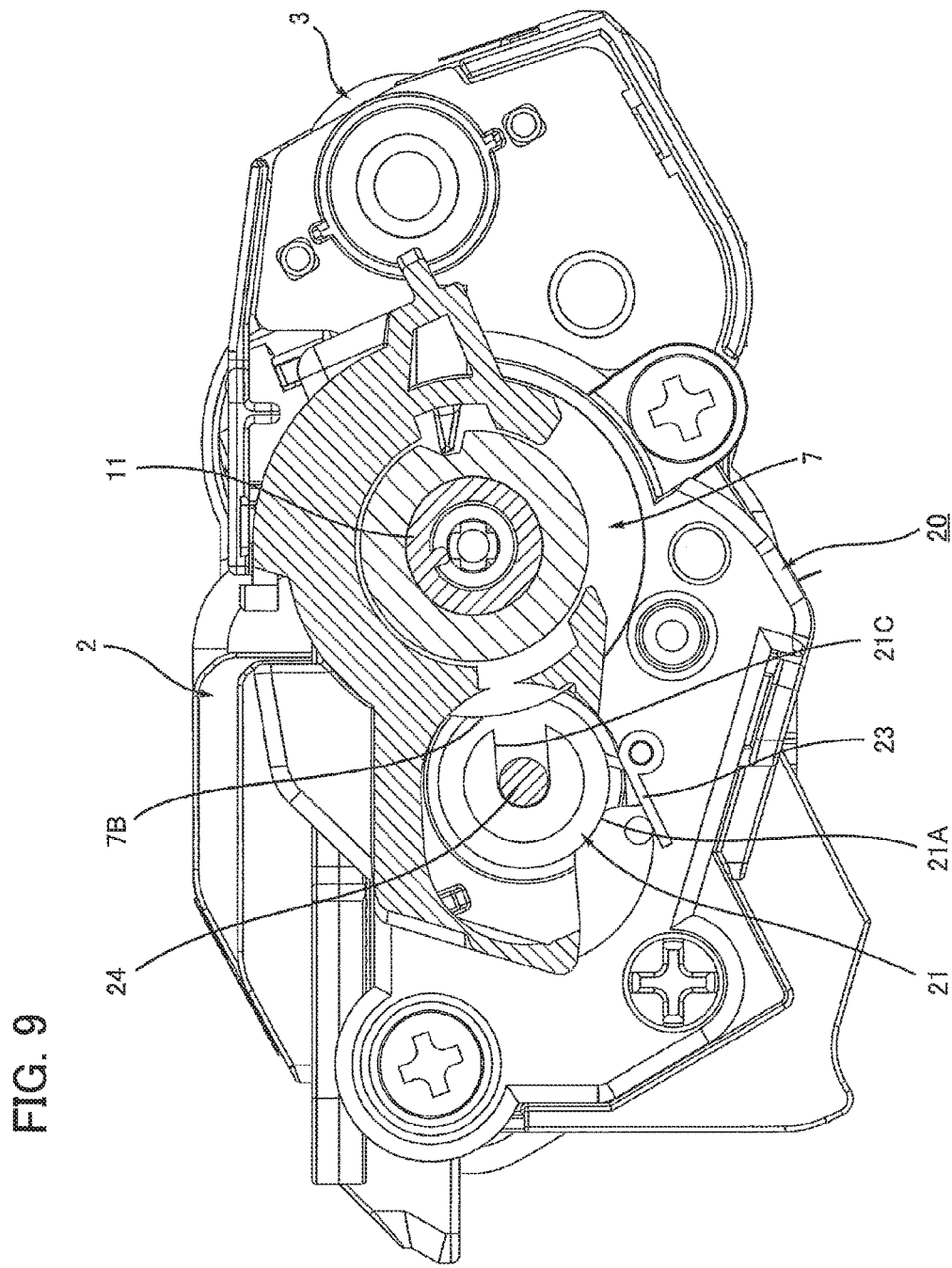
FIG. 9 is a cross-sectional view for description of movement of the first gear, and showing a state where the first gear has been rotated from a state shown in FIG. 8.
Figure 10:
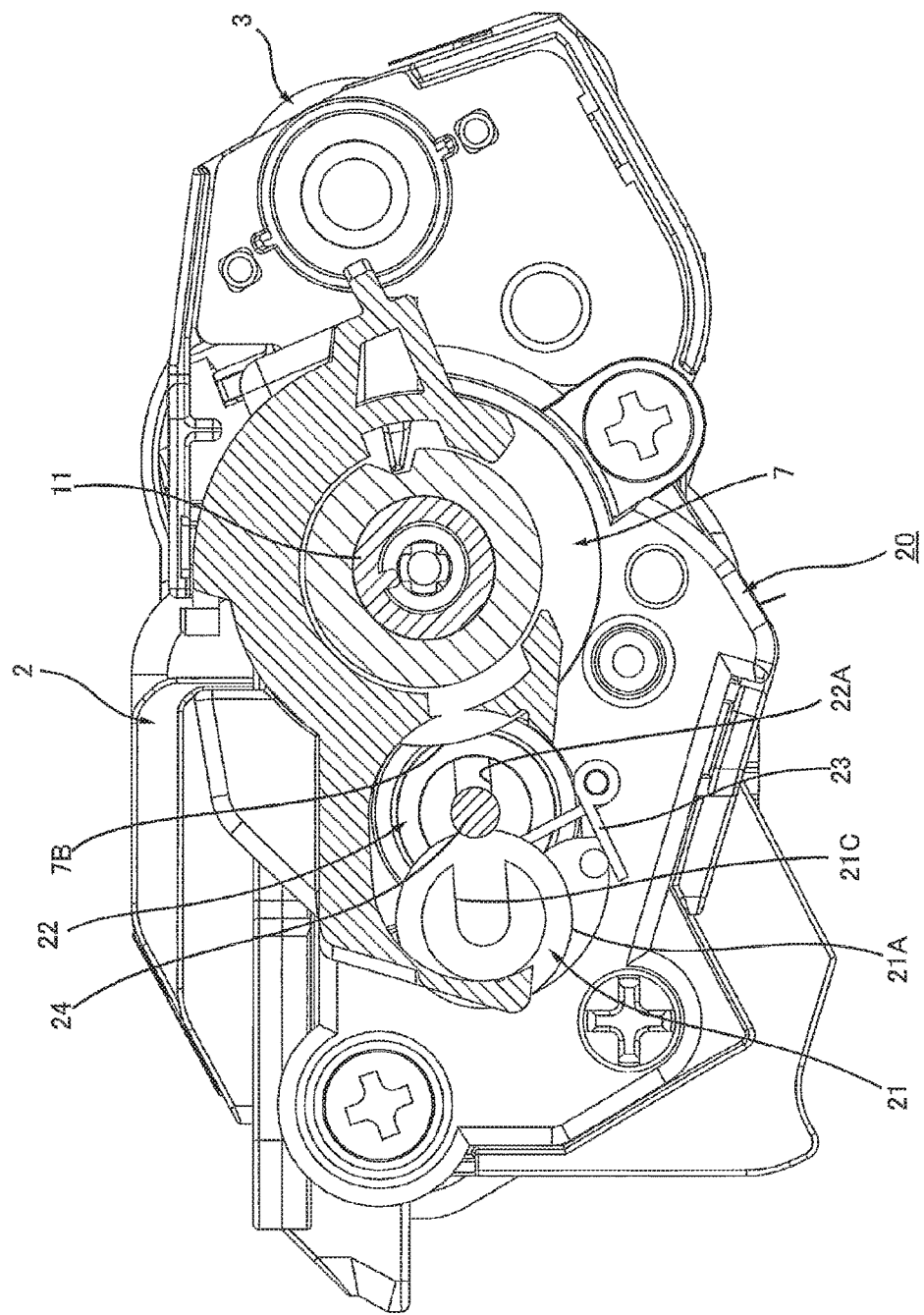
FIG. 10 is a cross-sectional view for description of movement of the first gear, and showing a state where the first gear is moved to a second position from the state shown in FIG. 9 in the developing cartridge according to the second embodiment.

As illustrated in FIG. 8, a shaft 24 of the gear cover 9 is inserted into the groove of the grooved portion 21C. The shaft 24 extends from an inner surface of the gear cover 9 and is integral therewith. A spring 23 is provided to urge the first gear 21 in a direction away from the second gear 7. The first gear 21 is at the first position against the urging force of the spring 23 in such a situation where the urging direction of the spring 23 crosses the extending direction of groove of the grooved portion 21C as illustrated in FIG. 8, because the shaft 24 is engaged with the groove of the grooved portion 21C. Further, the first gear 21 can be moved from the first position to a second position by the urging force of the spring 23 in such a situation where the extending direction of the groove of the grooved portion 21C becomes coincident with the urging direction of the spring 23 as illustrated in FIGS. 9 and 10 as a result of rotation of the first gear 21.

2. Operation in Developing Cartridge 20

The first gear 21 is positioned at the first position as illustrated in FIG. 8 when the developing cartridge 20 is attached to the image forming apparatus.

When the driving force is input from the image forming apparatus to the coupling 5 (FIG. 1), the driving force is transmitted from the coupling 5 to the connector 22 (FIG. 7) through the gear train (not shown) and the agitator 4. Thus, the first gear 21 is rotated together with the rotation of the connector 22, so that the second gear 7 is rotated as a result of force transmission from the first gear 21. Further, the protrusion 8 is circularly moved along with the rotation of the second gear 7, so that the protrusion 8 (FIG. 7) is moved along the peripheral surface of the shaft 11.

Then as illustrated in FIG. 9, the grooved portion 21C is rotated in accordance with the rotation of the first gear 21. When the extending direction of the groove of the grooved portion 21C becomes coincident with the urging direction of the spring 23 to the first gear 21, the first gear 21 is moved in a direction away from the second gear 7 from the first position to the second position as illustrated in FIG. 10 because of the urging force of the spring 23.

Then, the first gear 21 is moved apart from the second gear 7 so that the first gear 21 is disengaged from the second gear 7. Accordingly, rotation of the second gear 7 is stopped to stop movement of the protrusion 8.

Incidentally, after the first gear 21 is moved to the second position, the urging force of the spring 23 prevents the first gear 21 from moving toward the first position. In other words, the spring 23 functions as a stop member for maintaining the second position of the first gear 21 after the spring 23 moves the first gear 21 to the second position. The first gear 21 at the second position is interposed and supported between the cover 9 and the spring 23, which presses the first gear 23 toward the cover 9 to fix the first gear at the second position.

Function and effect in the second embodiment is the same as those of the first embodiment.

While the description has been made in detail with reference to specific embodiments thereof, it would be apparent to those skilled in the art that various changes and modifications may be made therein without departing from the spirit and scope of the above described embodiments.

What is claimed is:

1. A developing cartridge comprising:
   a first gear rotatable about a first axis extending in a predetermined direction; and
   a second gear configured to engage with the first gear and rotatable about a second axis extending in the predetermined direction, the second gear including a protrusion extending in the predetermined direction, the protrusion being circularly movable together with rotation of the second gear,
   wherein the first gear is movable in a direction away from the second gear from a first position in which the first gear engages with the second gear to a second position in which the first gear disengages from the second gear, and wherein the first gear is movable from the first position to the second position in a direction crossing the predetermined direction.

2. The developing cartridge according to claim 1, further comprising a stopper configured to fix the first gear at the second position.

3. The developing cartridge according to claim 1, further comprising a housing configured to accommodate developing agent.

4. The developing cartridge according to claim 3, further comprising:

a gear cover covering at least a portion of the first gear and the second gear, the gear cover having an opening, wherein the first gear and the second gear are positioned between the gear cover and the housing in the predetermined direction, and wherein, when the second gear in engagement with the first gear rotates, the protrusion passes through the opening in a state where the protrusion is exposed via the opening.

5. A developing cartridge comprising:

a housing configured to accommodate developing agent;

a first gear rotatable about a first axis extending in a predetermined direction;

a second gear configured to engage with the first gear and rotatable about a second axis extending in the predetermined direction;

a protrusion extending in the predetermined direction and circularly movable together with rotation of the second gear;

an agitator including an agitator shaft extending in the predetermined direction, the agitator configured to agitate the developing agent; and a connector connected to the agitator shaft and rotatable with the agitator shaft, the connector including a groove, wherein the first gear is movable in a direction away from the second gear from a first position in which the first gear engages with the second gear to a second position in which the first gear disengages from the second gear, wherein the first gear includes an engagement portion protruding in the predetermined direction toward the connector, the engagement portion extending in a radial direction of the first gear, and wherein the first gear is slidably movable relative to the connector along with the groove and the first gear is movable in the direction away from the second gear, in a state where the engagement portion engages the groove.

6. The developing cartridge according to claim 5, wherein the engagement portion is another protrusion, and wherein the first gear is slidably movable relative to the connector along with the groove and the first gear is movable in the direction away from the second gear, in a state where the protrusion is fitted into the groove.

* * * * *